United States Patent
Dou et al.

(10) Patent No.: US 12,490,055 B2
(45) Date of Patent: Dec. 2, 2025

(54) METHOD FOR DETERMINING CLOSE CONTACT TERMINAL DEVICE AND APPARATUS

(71) Applicant: HUAWEI TECHNOLOGIES CO., LTD., Guangdong (CN)

(72) Inventors: Fenghui Dou, Beijing (CN); Weiwei Chong, Shenzhen (CN); Xiaobo Wu, Shenzhen (CN); Hui Jin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 395 days.

(21) Appl. No.: 18/005,255

(22) PCT Filed: Jul. 13, 2021

(86) PCT No.: PCT/CN2021/105873
§ 371 (c)(1),
(2) Date: Jan. 12, 2023

(87) PCT Pub. No.: WO2022/012486
PCT Pub. Date: Jan. 20, 2022

(65) Prior Publication Data
US 2023/0254664 A1   Aug. 10, 2023

(30) Foreign Application Priority Data

Jul. 13, 2020   (CN) .......................... 202010669263.7
Nov. 25, 2020   (CN) .......................... 202011339781.9

(51) Int. Cl.
*H04W 4/00* (2018.01)
*H04W 4/029* (2018.01)

(52) U.S. Cl.
CPC .................................. *H04W 4/029* (2018.02)

(58) Field of Classification Search
CPC ...................................................... H04W 4/029
See application file for complete search history.

(56) References Cited

U.S. PATENT DOCUMENTS

| 2013/0275160 A1* | 10/2013 | Lev ................... H04M 3/42357 705/3 |
| 2014/0073362 A1* | 3/2014 | Kawata ................. G06Q 50/01 455/456.3 |
| 2021/0204154 A1* | 7/2021 | Li ....................... H04L 41/5019 |

FOREIGN PATENT DOCUMENTS

| CN | 108986921 A | 12/2018 |
| CN | 110944296 A | 3/2020 |
| CN | 111311018 A | 6/2020 |
| WO | 2020057261 A1 | 3/2020 |

OTHER PUBLICATIONS

3GPP TS 23.288 V16.4.0 (Jul. 2020), "3rd Generation Partnership Project; Technical Specification Group Services and System Aspects;Architecture enhancements for 5G System (5GS) to support network data analytics services(Release 16)" total 66 pages.

(Continued)

*Primary Examiner* — Erika A Washington

(57) ABSTRACT

A method and an apparatus for determining a terminal device in close contact with another terminal device are provided. The method includes: A first network element obtains data of a plurality of terminal devices and an identifier of a first terminal device. The first network element determines, based on the data of the plurality of terminal devices, movement analysis results respectively corresponding to the plurality of terminal devices. The movement analysis results respectively corresponding to the plurality of terminal devices include a movement analysis result of the first terminal device. The first network element determines at least one second terminal device based on the movement analysis results respectively corresponding to the plurality of terminal devices. A movement track of the second terminal (Continued)

device overlaps a movement track of the first terminal device, a movement manner of the second terminal device is the same as a movement manner of the first terminal device on an overlapping movement track, and at least one preset event experienced by the second terminal device is the same as a preset event experienced by the first terminal device on the overlapping movement track. In the foregoing method, a close contact can be accurately located.

20 Claims, 5 Drawing Sheets

(56) References Cited

OTHER PUBLICATIONS

3GPP TR 23.700-91 V0.4.0 (Jun. 2020),"3rd Generation Partnership Project; Technical Specification Group Services and System Aspects; Study on enablers for network automation for the 5G System (5GS); Phase 2(Release 17)" total 186 pages.
International Search Report and Written Opinion issued in PCT/CN2021/105873, dated Sep. 28, 2021, 10 pages.
Extended European Search Report issued in EP21841689.9, dated Dec. 1, 2023, 15 pages.
Office Action issued in CN202011339781.9, dated May 31, 2022, 9 pages.

\* cited by examiner

METHOD FOR DETERMINING CLOSE CONTACT TERMINAL DEVICE AND APPARATUS

CROSS-REFERENCE TO RELATED APPLICATIONS

This application is a National Stage of International Application No. PCT/CN2021/105873, filed on Jul. 13, 2021, which claims priority to Chinese Patent Application No. 202010669263.7, filed on Jul. 13, 2020 and Chinese Patent Application No. 202011339781.9, filed on Nov. 25, 2020, all of which are hereby incorporated by reference in their entireties.

TECHNICAL FIELD

Embodiments of this application relate to the communication field, and in particular, to a method for determining a close contact terminal device and an apparatus.

BACKGROUND

When an infectious disease breaks out, to effectively prevent spread of the infectious disease, persons who have been in contact with a confirmed case suffering from the infectious disease need to be promptly screened and quarantined to different degrees. Generally, an infectious disease has a specific incubation period. A confirmed case will travel for many times from a time point when the confirmed case is infected with the infectious disease to a time point when the confirmed case is diagnosed, and the confirmed case is in unconscious close contact with many people on each trip. Consequently, a great risk of disease transmission is caused, and it is difficult to prevent and control the epidemic. Therefore, how to quickly and accurately locate a close contact becomes an urgent problem to be solved.

Currently, travel information screening (for example, whether to take an airplane, a train, or a bus on a same shift as the confirmed case) and mobile network screening (for example, a coverage area of a mobile network cell on which a mobile phone of the confirmed case camps is used as a key screening area) are mainly performed in a manual manner based on related information of the confirmed case. However, the foregoing screening manner is time-consuming and labor-consuming, and there is a high probability of missed screening. In one aspect, a scope of travel information screen is limited. For example, only a transportation means with a real-name information requirement can be screened, that is, only long-distance travel can be screened, and it is difficult to screen short-distance intra-city travel, for example, a subway or a bus. In another aspect, it is difficult to screen intra-city travel scenarios with strong mobility through mobile networks. For example, terminal devices at a same location may camp on different cells, and enter and leave each cell at different time points. Therefore, there may be a problem of misidentifying a close contact, or there may be a problem of missed identifying of a close contact.

SUMMARY

Embodiments of this application provide a method for determining a close contact terminal device and an apparatus, to quickly and accurately locate a close contact.

According to a first aspect, an embodiment of this application provides a method for determining a close contact terminal device. The method includes: A first network element obtains data of a plurality of terminal devices and an identifier of a first terminal device. The first network element determines, based on the data of the plurality of terminal devices, movement analysis results respectively corresponding to the plurality of terminal devices. The data of the plurality of terminal devices includes data of the first terminal device, and the movement analysis results respectively corresponding to the plurality of terminal devices include a movement analysis result of the first terminal device. The movement analysis result of the first terminal device includes a movement track of the first terminal device, a movement manner of the first terminal device on the movement track, and a preset event experienced by the first terminal device on the movement track. The first network element determines at least one second terminal device based on the movement analysis results respectively corresponding to the plurality of terminal devices. A movement track of the second terminal device overlaps the movement track of the first terminal device, a movement manner of the second terminal device is the same as the movement manner of the first terminal device on an overlapping movement track, and there is a same preset event in a preset event experienced by the second terminal device and the preset event experienced by the first terminal device on the overlapping movement track.

In the foregoing method, a close contact can be accurately located. In addition, embodiments of this application are not only applicable to screening of a close contact that travels by a transportation means with a real-name information requirement, but also applicable to screening of a close contact that travels in a short distance in a city, for example, travels by a subway or a bus. Therefore, embodiments of this application are applied to a wide range of scenarios.

In a possible design, the method further includes: The first network element sends first information to the second terminal device. The first information indicates that the second terminal device is a terminal device in close contact with the first terminal device.

According to the foregoing design, the first network element may directly notify the second terminal device that the second terminal device is the terminal device in close contact with the first terminal device.

In a possible design, that a first network element obtains an identifier of a first terminal device includes: The first network element receives second information from a second network element. The second information is used to request the terminal device in close contact with the first terminal device, and the second information includes the identifier of the first terminal device. The first network element sends third information to the second network element. The third information includes indicating that the at least one second terminal is a terminal device in close contact with the first terminal device.

According to the foregoing design, the first network element may determine, based on the terminal device indicated by the second network element, a terminal device in close contact with the terminal device.

In a possible design, the third information further includes a confidence probability corresponding to the at least one second terminal device. The confidence probability is used to describe a possibility that the second terminal device is in close contact with the first terminal device.

According to the foregoing design, the first network element may further determine a possibility that each second terminal device is in close contact with the first terminal device.

In a possible design, the method further includes: The first network element determines a third terminal device. The third terminal device is a terminal device in the at least one second terminal device. Both the third terminal device and the first terminal device take a first vehicle on a first movement track. A difference between a time point when the first terminal device experiences a first event and a time point when the third terminal device experiences the first event on the first movement track is less than a preset threshold. The first movement track is determined by an overlapping part between a movement track of the third terminal device and the movement track of the first terminal device. The first network element sends fourth information to the second network element. The fourth information indicates that the third terminal device and the first terminal device have been located in a same space range of the first vehicle.

According to the foregoing design, the first network element may determine a terminal device that has been located in a same space range of the first vehicle as the first terminal device, for example, may determine a terminal device that is located in a same subway carriage or train carriage as the first terminal device, to improve precision of determining the terminal device in close contact with the first terminal device.

In a possible design, the method further includes: The first network element receives fifth information from a fourth terminal device. The fifth information is used to query whether the fourth terminal device is the terminal device in close contact with the first terminal device, and the fifth information includes an identifier of the fourth terminal device. When the first network element determines that the fourth terminal device is one of the at least one second terminal device, the first network element sends sixth information to the fourth terminal device. The sixth information indicates that the fourth terminal device is the terminal device in close contact with the first terminal device.

According to the foregoing design, the first network element may feed back, to another terminal device based on a query request of the another terminal device, a query result indicating whether the terminal device is the terminal device in close contact with the first terminal device.

In a possible design, the first information further indicates a first time period. When the first network element determines, based on the data of the plurality of terminal devices, the movement analysis results respectively corresponding to the plurality of terminal devices, the first network element determines, based on the data of the plurality of terminal devices, movement analysis results respectively corresponding to the plurality of terminal devices in the first time period.

According to the foregoing design, the first network element may filter data based on an actual requirement with reference to a preset time period, so that the obtained movement analysis result is more targeted.

In a possible design, the first information further indicates a first area. When the first network element determines, based on the data of the plurality of terminal devices, the movement analysis results respectively corresponding to the plurality of terminal devices, the first network element determines, based on the data of the plurality of terminal devices, movement analysis results respectively corresponding to the plurality of terminal devices in the first area.

According to the foregoing design, the first network element may filter data based on an actual requirement with reference to preset area information, so that the obtained movement analysis result is more targeted.

In a possible design, the preset event includes at least one of stopping the vehicle, starting the vehicle, driving the vehicle through an uphill road section, driving the vehicle through a downhill road section, turning of the vehicle, driving the vehicle through a bridge, driving the vehicle through a tunnel, a network disconnection, or a network standard change.

According to the foregoing design, the first network element may learn and determine a plurality of preset events, so that accuracy of a result of obtaining the terminal device in close contact with the first terminal device can be improved.

In a possible design, the data of the first terminal device includes at least one of application data of the first terminal device, location information of the first terminal device, an identifier of a serving cell in which the first terminal device is located, an identifier of a neighboring cell of the serving cell, a signal strength measurement value of the serving cell, a signal quality measurement value of the serving cell, a signal-to-noise ratio of the serving cell, or a signal strength measurement value of the neighboring cell.

According to the foregoing design, the first network element can relatively accurately generate the movement analysis result of the first terminal device, and more data types indicate higher accuracy of the movement analysis result.

In a possible design, when the first network element determines, based on the data of the plurality of terminal devices, the movement analysis results respectively corresponding to the plurality of terminal devices, the first network element determines, by using a preset model and based on the data of the plurality of terminal devices, the movement analysis results respectively corresponding to the plurality of terminal devices. The preset model is used to generate the movement analysis result.

In a possible design, the preset model is obtained based on a plurality of pieces of historical data. A $j^{th}$ piece of historical data corresponds to a $j^{th}$ terminal device, and j is a positive integer. The $j^{th}$ piece of historical data includes at least one of application data of the $j^{th}$ terminal device, location information of the $j^{th}$ terminal device, an identifier of a serving cell in which the $j^{th}$ terminal device is located, an identifier of a neighboring cell of the serving cell in which the $j^{th}$ terminal device is located, a signal strength measurement value of the serving cell in which the $j^{th}$ terminal device is located, a signal quality measurement value of the serving cell in which the $j^{th}$ terminal device is located, a signal-to-noise ratio of the serving cell in which the $j^{th}$ terminal device is located, or a signal strength measurement value of the neighboring cell of the serving cell in which the $j^{th}$ terminal device is located.

According to the foregoing design, the first network element can obtain the preset model by using a plurality of pieces of historical data, and prediction accuracy of the preset model is relatively high.

According to a second aspect, an embodiment of this application provides a communication apparatus. The apparatus includes a module configured to perform any one of the first aspect and the possible designs of the first aspect.

According to a third aspect, an embodiment of this application provides a communication apparatus, including a processor and an interface circuit. The interface circuit is configured to receive a signal from a communication apparatus other than the communication apparatus and transmit the signal to the processor, or send a signal from the processor to a communication apparatus other than the communication apparatus. The processor is configured to implement any one of the first aspect and the possible designs of the first aspect by using a logic circuit or executing code instructions.

According to a fourth aspect, an embodiment of this application provides a computer-readable storage medium. The storage medium stores a computer program or instructions, and when the computer program or the instructions is/are executed by a communication apparatus, any one of the first aspect and the possible designs of the first aspect is implemented.

According to a fifth aspect, an embodiment of this application provides a computer program product including a program. When the computer program product runs on a communication apparatus, the communication apparatus is enabled to perform any one of the first aspect or the possible designs of the first aspect.

DESCRIPTION OF EMBODIMENTS

Figure 1:
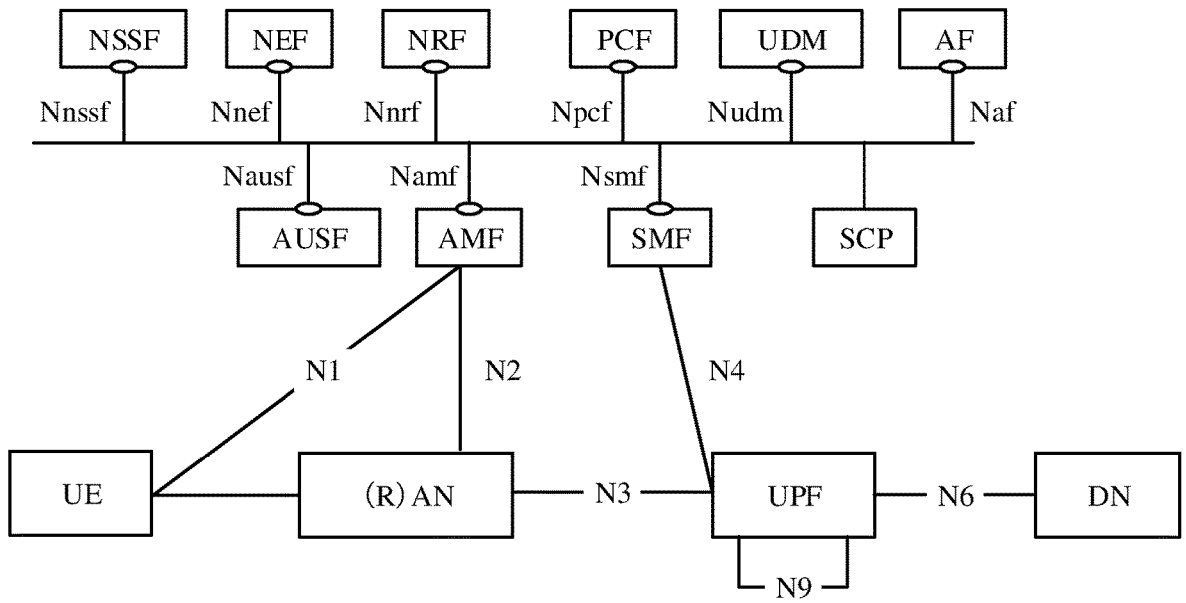
FIG. 1 is a schematic diagram of an architecture of a mobile communications system according to an embodiment of this application.

A system architecture to which embodiments of this application are applicable includes but is not limited to a 5G mobile communications system, as shown in FIG. 1.

The following briefly describes network elements in embodiments of this application.

Network data analytics function (NWDAF): The NWDAF has functions of data collection, data training, data analysis, and data inference, which may be configured to collect related data from a network element, a third-party service server, a terminal device, or a network management system, perform analysis and training based on the related data, and provide a data analysis result for the network element, the third-party service server, the terminal device, or the network management system. The analysis result may assist a network in selecting a quality of service parameter of a service, performing traffic routing, selecting a background traffic transmission policy, or the like.

Policy control function (PCF) network element: The PCF is configured to provide a network device or a service subscriber with various related policies such as an access control policy, a session control policy, and a charging policy.

New radio (NR): a 5G network, namely a new access network technology and standard.

Evolved universal terrestrial radio access network (E-UTRAN): a new radio access architecture proposed in 3GPP release R8, which features a high transmission rate, a low delay, data packet optimization, and the like. The E-UTRAN includes several base stations (E-NodeBs) and provides an E-UTRA user plane (physical layer (PHY)) protocol or a media access control (MAC) layer and control plane (radio resource control (RRC)) protocol that are terminated on UE.

The terminal device includes but is not limited to user equipment (UE), a subscriber unit, a subscriber station, a mobile station, a remote station, a remote terminal device, a mobile terminal device, a user terminal device, a wireless communication device, a user agent, a user apparatus, a cellular phone, a cordless phone, a session initiation protocol (SIP) phone, a wireless local loop (WLL) station, a personal digital assistant (PDA), a handheld device having a wireless communication function, a computing device, a processing device connected to a wireless modem, a vehicle-mounted device, a wearable device, an terminal device in an Internet of Things, a household appliance, a virtual reality device, a terminal device in a future 5G network, a terminal device in a future evolved public land mobile network (PLMN), or the like.

Access and mobility management function (AMF) network element: The AMF provides functions such as mobility management, lawful interception, or access authorization and authentication.

Session management function (SMF): The SMF is configured to implement session and bearer management, address allocation, and the like. A user plane function network element is configured to perform functions such as routing and forwarding of user plane data, threshold control, traffic monitoring, and verification.

Unified data management (UDM) network element: The UDM provides the terminal device with at least one of the following functions: 3GPP AKA authentication credential processing, user identification processing, access authorization, registration/mobility management, subscription management, or SMS message management.

Mobility management entity (MME): a network element that provides a mobility management function in a long term evolution (LTE) network.

Application function (AF) network element: a server side that provides a type of service for a user. Therefore, the AF may also be referred to as an application server or a service server. The AF may be an AF deployed on an operator network, or may be a third-party AF.

In some embodiments, embodiments of this application may be applied to a multi-NWDAF deployment architecture. A plurality of NWDAFs is allowed to be deployed in a network. Each NWDAF may serve different areas, and may have an analysis type for which the NWDAF is responsible. For example, some NWDAFs are responsible for associated network data analysis in an area 1, and some NWDAFs are responsible for network data analysis in an area 2. For another example, some NWDAFs may provide analysis of network element load, a user movement track, and service experience, and some NWDAFs may provide analysis related to an emergency event and a public safety event. The user movement track may be a series of data of timestamps and user location information. For example, the user location information may be represented by using any one or more of information (a cell identifier, a signal strength, signal quality, and the like) about a mobile network cell on which the UE has camped, Wi-Fi network information (a service set identifier (SSID), a signal strength, and the like), global positioning system (GPS) location information, a place at which the UE has arrived, a route that the UE enters or terminates, and the like.

In some embodiments, embodiments of this application may be applied to a hierarchical deployment architecture of the NWDAF. The network allows hierarchical deployment of NWDAFs in different jurisdictions. For example, a central NWDAF is deployed in an entire national PLMN, and marginal NWDAFs are respectively deployed in different provinces and cities.

In addition, it may be understood that the NWDAF may be independently deployed as a network element, or may be co-deployed with another network element. For example, the NWDAF may be co-deployed with a network element such as an SMF or an AMF.

It may be understood that this embodiment of this application is not limited to being applicable to only a 5G network, and is applicable to all communication standard networks in which a data analytics function is deployed. In addition, the data analytics function is not limited to being provided only by the NWDAF, and may be provided by another module or network element having the data analytics function.

The preset event in embodiments of this application includes two types. A first type is a movement related preset event, for example, stopping a vehicle, starting the vehicle, driving the vehicle through an uphill road section, driving the vehicle through a downhill road section, turning of the vehicle, driving the vehicle through a bridge, or driving the vehicle through a tunnel. A second type is a network related preset event, for example, a network disconnection or a network standard change (for example, an access network of the terminal device changes from a 5G network to a 4G network).

The movement manner of the terminal device in embodiments of this application is a movement manner of a user holding the terminal device. The movement manner may include but is not limited to walking, running, riding a bicycle, riding an e-bike, driving, taking a bus, taking a subway, taking a train, and the like. For example, taking a train may indicate taking a high-speed railway, a normal train, an express train, or the like. This is not limited in this application.

An embodiment of this application provides a method for determining a close contact terminal device, to quickly and accurately locate a close contact. The first network element first collects data of a plurality of terminal devices, and after obtaining an identifier of a first terminal device, determines, based on the data of the plurality of terminal devices, movement analysis results respectively corresponding to the plurality of terminal devices. The data of the plurality of terminal devices includes data of the first terminal device, and the movement analysis results respectively corresponding to the plurality of terminal devices include a movement analysis result of the first terminal device. Further, the first network element determines at least one second terminal device based on the movement analysis results respectively corresponding to the plurality of terminal devices. A movement track of the second terminal device overlaps a movement track of the first terminal device, a movement manner of the second terminal device is the same as a movement manner of the first terminal device on an overlapping movement track, and there is a same preset event in a preset event experienced by the second terminal device and a preset event experienced by the first terminal device on the overlapping movement track. The first network element may be an NWDAF, a network element such as an SMF or an AMF that includes an NWDAF function, or another network element that has a function similar to the NWDAF function. This is not limited in this embodiment of this application. For example, when a user of the first terminal device is a confirmed case suffering from an infectious disease, the first network element may determine at least one second terminal device by using the foregoing method. A user corresponding to the at least one second terminal device is a person in close contact with the confirmed case. In the foregoing embodiment, a close contact can be accurately located. In addition, this embodiment of this application is not only applicable to screening of a close contact that travels by a transportation means with a real-name information requirement, but also applicable to screening of a close contact that travels in a short distance in a city, for example, travels by a subway or a bus. Therefore, this embodiment of this application is applied to a wide range of scenarios.

The following first describes a specific method for obtaining a preset model by the first network element. The preset model is used to generate a movement analysis result. That the first network element obtains the preset model includes the following two phases.

Phase 1: The first network element collects historical data.

A $j^{th}$ piece of historical data corresponds to a $j^{th}$ terminal device, and j is a positive integer. The $j^{th}$ piece of historical data includes at least one of application data of the $j^{th}$ terminal device, location information of the $j^{th}$ terminal device, an identifier of a serving cell in which the $j^{th}$ terminal device is located, an identifier of a neighboring cell of the serving cell in which the $j^{th}$ terminal device is located, a signal strength measurement value of the serving cell in which the $j^{th}$ terminal device is located, a signal quality measurement value of the serving cell in which the $j^{th}$ terminal device is located, a signal-to-noise ratio of the serving cell in which the $j^{th}$ terminal device is located, or a signal strength measurement value of the neighboring cell of the serving cell in which the $j^{th}$ terminal device is located.

It may be understood that a specific condition for initiating historical data collection by the first network element is not limited in this embodiment of this application.

For example, historical data collection may be started by triggering of the preset event, or may be started within a specified time period. For example, the first network element starts historical data collection during an epidemic period of an infectious disease. For another example, when another network element (for example, an AF) subscribes to related information of at least one UE from the first network element, the first network element starts to collect historical data. The related information herein may include a movement track of the UE, a movement manner of the UE, a preset event experienced by the UE, and the like.

For example, historical data collection may also be actively started by the first network element.

It may be understood that a source of the historical data is not limited in this embodiment of this application. For example, the historical data sources may include but are not limited to the AF, a 5G network element, operation and maintenance management (OAM), the UE, and the like.

Figure 2:
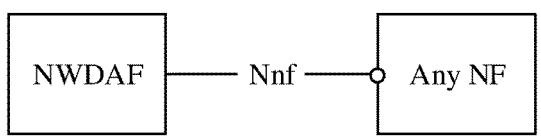
FIG. 2 is a schematic diagram of an architecture in which an NWDAF collects data from another NF according to an embodiment of this application.

A 5G system architecture allows the NWDAF to collect data from another NF. FIG. 2 shows an architecture in which the NWDAF collects data from another NF.

An Nnf interface is used by the NWDAF to request another NF to report or cancel subscription to specific data.

Figure 3:
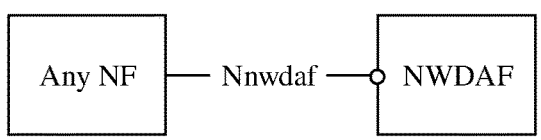
FIG. 3 is a schematic diagram of an architecture in which another NF collects data from an NWDAF according to an embodiment of this application.

The 5G system architecture allows another NF to obtain network analysis data from the NWDAF. FIG. 3 shows an architecture in which another NF collects data from the NWDAF.

An Nnwdaf interface is used by another NF to request the NWDAF to report or cancel subscription to specific network analysis data reporting.

Figure 4:
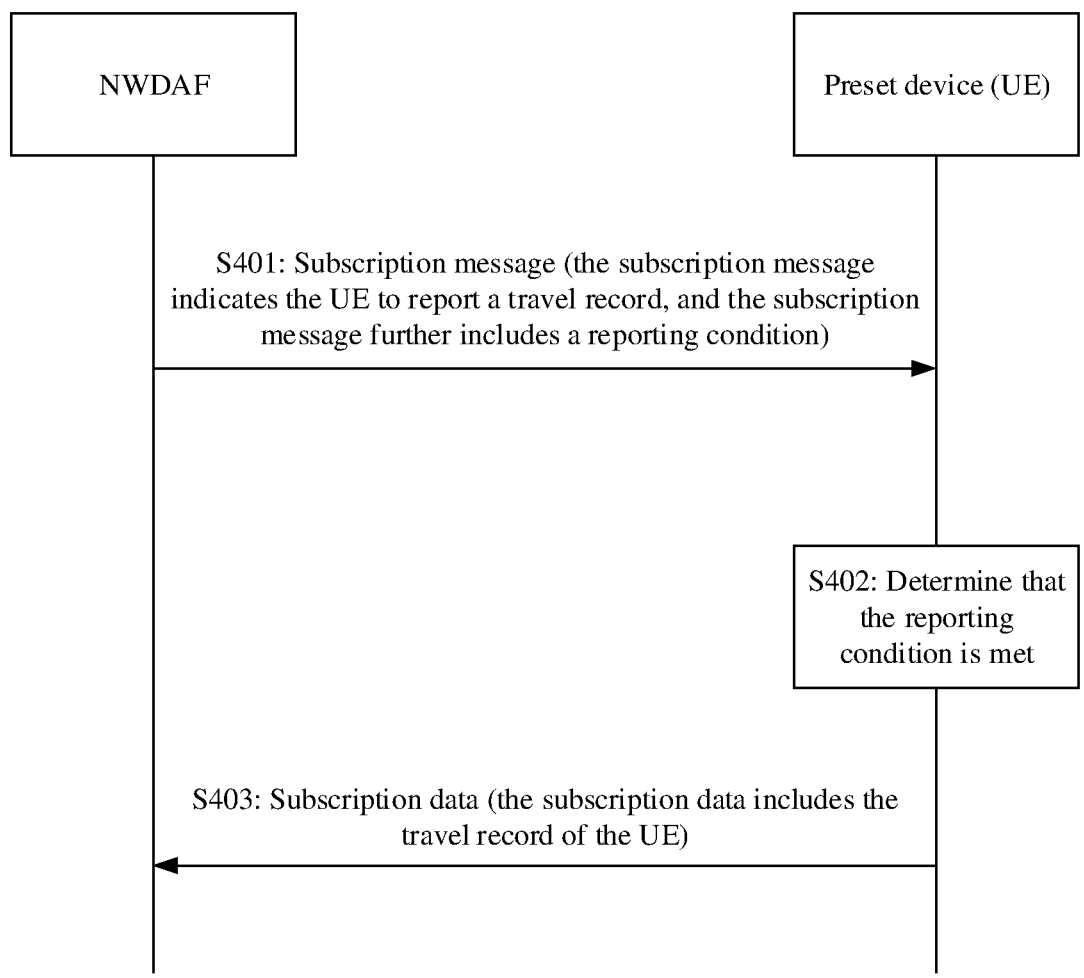
FIG. 4 is a schematic diagram of collecting historical data according to an embodiment of this application.

FIG. 4 is a specific schematic flowchart in which the NWDAF subscribes to data.

S401: The NWDAF sends a subscription message to a preset device. For example, the NWDAF may send the subscription message to at least one device of the UE, the AF, or a network function (NF). The subscription message is used to collect the historical data, and the subscription message may further include a reporting condition. For example, the NWDAF sends the subscription message to the UE. The subscription message indicates the UE to report a travel record. The subscription message further includes the reporting condition. The reporting condition may include regular reporting or periodic reporting, or indicate the UE to report data in a preset time period and/or a preset area.

S402: The preset device determines that the reporting condition is met.

S403: The preset device sends subscription data to the NWDAF. The subscription data includes the travel record of the UE.

The following uses only an example in which the first network element collects historical data of one UE for description. Another UE may obtain corresponding historical data or more or fewer types of historical data with reference to the following manner. It should be understood that the following listed data types are merely examples, and are not intended to limit this embodiment of this application. A person skilled in the art may further collect more or fewer types of historical data for model training.

Based on different data sources, the historical data of the UE collected by the first network element may include three parts. The following separately describes first data, second data, and third data. The first data may be from the AF, and the second data may be from a network element such as the NF, the OAM, or a radio access network (RAN). The third data may be from the UE.

The first data includes application data of the UE. For example, a first part of data may include application data of a sports application, application data of a traffic application, or application data of an applet. For example, each piece of application data may include an application identifier (application ID), an application type, a timestamp, and the like. For example, the first data may include bicycle data recorded by a bicycle sharing application, code scanning data recorded by a traffic application, and the like.

For example, when the first data may include bicycle data recorded by a bicycle sharing application, the first data may include information such as a time point (for example, 17:30) at which a user unlocks a bicycle, a time point (for example, 17:45) at which the user locks the bicycle, and a bicycle route (for example, from an office building X to a subway station Y) of the user, and the third network element may determine that the user rides the bicycle from 17:30 to 17:45.

For example, when the first data includes application data of some traffic applications of the UE, the third network element may determine card swiping behavior or code scanning behavior of the user based on the application data of the traffic applications of the UE, and further determine that the user using the UE takes a vehicle within a time period. For example, if application data recorded by a traffic application includes route information (for example, Bus 300) and information about getting on and off a station (for example, getting on at station A at 7:00 and getting off at station B at 8:00), the third network element may determine that the user takes a bus from 7:00 to 8:00. For another example, if data recorded by a traffic application includes line information (for example, subway line 10) and station entry and exit information (for example, entering station C at 7:00 and exiting station D at 8:00), the third network element may determine that the user takes a subway from 7:00 to 8:00.

For example, when the first data may include movement data recorded by a sports application, the first data may include information such as a movement start time point (for example, 19:30), a movement end time point (for example, 20:05), and a movement manner (for example, running) and a pace of the user, and the third network element may determine that the user runs from 19:30 to 20:05.

For example, when the first data may include data recorded by a map application, the first data may include information such as a navigation start time point (for example, 19:30), a navigation end time point (for example, 20:05), an average vehicle speed, and a driving route, and the third network element may determine that the user drives from 19:30 to 20:05.

The second data includes network data related to the UE. For example, a second part of data may include location information of the UE (for example, GPS location information, BeiDou positioning information, and network positioning information (that is, location information determined based on a serving cell of the UE, a neighboring cell of the serving cell, Wi-Fi, or another cell identifier and a signal strength-related parameter)), an identifier of the serving cell of the UE, and a signal strength measurement value (for example, a reference signal received power (RSRP)) of the serving cell, a signal quality measurement value (for example, reference signal received quality (RSRQ)) of the serving cell, a signal-to-noise ratio (for example, a signal to interference plus noise ratio (SINR)) of the serving cell, an identifier of the neighboring cell of the serving cell of the UE, a signal strength measurement value of the neighboring cell, a signal quality measurement value of the neighboring cell, and the like.

It may be understood that, generally, network topology information may not be included in the second data, and the network topology information may be obtained separately. For example, the first network element may store a network topology in advance or obtain the network topology from another network element. The network topology information may include access network information or core network information of a mobile network (for example, a mobile network of China Mobile in Beijing) in a city or an area. The access network information mainly indicates which base stations cover the city or area and an attribute of each base station. The attribute of each base station includes which cells, a capacity of each cell, a geographical location of each cell, a coverage area of each cell, a coverage attribute (for example, a hotspot, a high-speed railway, or indoor) of each cell, and the like. The core network information mainly indicates which core network devices (such as an AMF, an SMF, and a UPF in a 5G network) provide a service in the city or area, a service scope, a capacity, a feature, and the like of each device.

In an example, when the second data includes an identifier of each serving cell through which the UE passes and a time point at which the UE accesses each serving cell, the first network element may determine the movement track of the UE and the movement manner of the UE based on the network topology information, the identifier of each serving cell, and a coverage attribute of a cell (for example, the cell is a cell covering a segment of a high-speed railway, or the cell is a cell covering a segment of a subway). For example, the second data includes time points at which the UE accesses a cell 1 and a cell 2, an identifier of the cell 1, and an identifier of the cell 2, and the cell 1 and the cell 2 are cells covering a segment of a high-speed railway. The first network element may roughly determine a moving speed of the UE based on the time points at which the UE accesses the cell 1 and the cell 2 and coverage areas of the cell 1 and the cell 2, and further estimate the movement manner of the UE. For example, if the first network element determines that the moving speed of the UE is 300 km/h, the movement manner of the UE is taking a high-speed railway.

It should be noted that, generally, a coverage area of the serving cell is large. To improve determining accuracy, when the UE passes through each serving cell, the UE may simultaneously obtain a signal strength-related parameter of the serving cell, an identifier and a signal strength-related parameter of the neighboring cell, and include the data into the second data. In this way, a range of the UE in the serving cell can be narrowed, to help determine the movement track of the UE, and improve precision of determining the movement manner of the UE and the movement track of the UE. Therefore, missed determining or mis-determining of a close contact can be effectively reduced. For example, the second data may further include an RSRP of the cell 1, RSRQ of the cell 1, an SINR of the cell 1, RSRQ of the cell 2, an RSRP of the cell 2, an SINR of the cell 2, an RSRP of a cell 3, RSRQ of the cell 3, an RSRP of a cell 4, and RSRQ of the cell 4. The cell 3 and the cell 4 are neighboring cells of the cell 1. The range of the UE in the serving cell can be narrowed by using the foregoing data. This helps determine the movement track of the UE, and improve precision of determining the movement manner of the UE and the movement track of the UE.

In another example, the second data may further include location information (for example, GPS location information or BeiDou positioning information) of a plurality of locations through which the UE passes and a time point at which the UE passes through each location. Further, the first network element may determine the movement track of the UE, roughly determine the moving speed of the UE based on a distance between the plurality of locations and the time point at which the UE passes through each location, and further determine the movement manner of the UE. The location information of the location through which the UE passes may be collected periodically, or may be collected by triggering of a specific event. For example, the user starts an application, and the application needs to obtain the location information of the UE.

Table 1 shows data collected by the first network element from the AF, the AN, the OAM, the RAN, and the NF when the first network element is the NWDAF.

UE service behavior may directly obtain an analysis result from another NWDAF, or the analysis result may be generated by collecting data from the AF and analyzing the data. For example, the UE service behavior includes a preference and regularity of using an application by the user. For example, a user A usually uses an application A from 21:00 to 22:00, and a user B usually uses an application B from 19:00 to 20:00. The preference and regularity of using an application by a user are related to movement behavior of the user to some extent. For example, the user usually watches a video when taking a bus. Therefore, the NWDAF may learn an association relationship between the UE service behavior and the movement manner of the UE. Further, the UE service behavior may be used as assistance information to determine the movement manner of the UE.

A UE's network related event includes events such as a network disconnection (for example, including no network service and a failure of initiating a voice and/or data service) of the UE, falling into a lower standard (for example, falling from 5G/4G to 3G/2G), restoring a higher standard (for example, restoring from 3G/2G to 4G/5G). The NWDAF may obtain the event from the AMF, the OAM, the RAN, or the like.

TABLE 1

First data and second data obtained by the NWDAF
Information

Start time, End time
The identifier of the serving cell and the identifier of the neighboring cell of the serving cell, the signal strength measurement value of the serving cell, the signal quality measurement value of the serving cell, the signal-to-noise ratio of the serving cell (obtained from the OAM/RAN), the signal strength measurement value of the neighboring cell of the serving cell, and the location information of the UE (UE location)
Network topology information (obtained from the OAM)
Location information (for example, a cell center or a cell edge) (obtained from an access node (AN)) of the UE in the serving cell
Application data (obtained from the AF) of a sports application and/or a traffic application and an applet that are used by the UE
UE service behavior
UE's network related preset event In Table 1, the start time and the end time are used to describe a time period corresponding to obtaining data in Table 1, the location information of the UE may be understood as absolute location information, and the location information of the UE in the serving cell may be understood as relative location information.

The third data includes a movement manner recorded by the UE, a timestamp related to the movement manner, information (a cell identifier, a signal strength, signal quality, and the like) about a mobile network cell on which the UE has camped, Wi-Fi network information (an SSID, a signal strength, and the like), GPS location information, a place at which the UE has arrived, a route (that is, the movement track of the UE) that the UE enters or terminates, a preset event recorded by the UE, and a timestamp related to the preset event. A UE's movement related preset event may include but is not limited to at least one of stopping a vehicle, starting the vehicle, driving the vehicle through an uphill road section, driving the vehicle through a downhill road section, turning of the vehicle, driving the vehicle through a bridge, or driving the vehicle through a tunnel. The UE's network related preset event includes a network disconnection, a network standard change, or the like. For example, the UE may obtain cell information, and each cell has a corresponding standard (for example, 2G, 3G, 4G, or 5G). Further, the UE may determine the UE's network related preset event by determining the network standard change. In addition, when no cell is obtained through searching by the UE, it may be considered that the UE is disconnected from a network. A modem in the UE may report the UE's network related preset event to an operating system (for example, an Android system).

It may be understood that the foregoing preset event is merely an example, and is not intended to limit this embodiment of this application.

For example, the UE may receive a subscription message from the NWDAF. The subscription message is used to subscribe to a travel record (that is, the third data) of the user. The travel record includes a movement manner used when the user travels, a movement related preset event experienced by the user, and the like. In addition, the UE reports the travel record to the NWDAF based on a specific cycle (for example, every day or whenever a trip is completed), or may report one or more pieces of content in the travel record to the NWDAF in real time. The UE may determine the movement manner of the UE based on application data (for example, the application data of the sports application, the application data of the traffic application, or the application data of the applet), and may obtain, based on sensor data, the movement related preset event experienced by the UE through analysis. The sensor data may include data of sensors such as a magnetometer, a gravity meter, and an accelerometer.

For example, the UE may determine the card swiping behavior of the user based on application data of some traffic applications installed on the UE, and further determine that the user using the UE takes a bus. The UE may report, to the NWDAF, that the UE takes a bus in a specific time period. Alternatively, the UE may report the application data of the traffic application to the NWDAF, and the NWDAF determines the movement manner of the UE. Further, the UE collects the sensor data when taking a bus, and determines preset events such as when the bus is started, when the bus is stopped, and when the bus turns. For example, when the bus is started, data collected by the accelerometer in the UE changes significantly. Therefore, the data of the accelerometer may be used as a basis for determining whether the bus is started.

For example, the UE may further calculate, based on a time point at which the UE arrives at a place A and a time point at which the UE arrives at a place B, speeds at which the UE passes through the place A and the place B, and further estimate the movement manner of the UE.

TABLE 2

Third data (that is, the travel record) collected by the NWDAF from the UE

Information

Start time, End time, and Timestamp
Movement manner (for example, walking, running, riding a bicycle, riding an e-bike, driving, taking a bus, taking a subway, or taking a train)
Sports or traffic application, applet, and near field communication (NFC) usage behavior
A place at which the UE has arrived and a route that the UE enters or terminates
UE's movement related preset event (for example, stopping a vehicle, starting the vehicle, driving the vehicle through an uphill road section, driving the vehicle through a downhill road section, turning of the vehicle, driving the vehicle through a bridge, or driving the vehicle through a tunnel)
UE's network related preset event (for example, a network disconnection or a network standard change)

In conclusion, the historical data collected by the first network element may include but is not limited to content listed in the following Table 3.

TABLE 3

Historical data of the UE collected by the first network element

| Information | Data source | Data description |
| --- | --- | --- |
| UE ID | AF/SMF/AMF | User identifier information, which is used to uniquely identify a user |
| Correlation ID | AF | An IP quintuplet or a new temporary identifier that is allocated by a 5G core network, which is used by the NWDAF to associate data from the AF and data from the NF |
| Timestamp | AF/SMF/AMF | Timestamp |
| UE location information | AMF | User location information, which may be information about a network location or another geographic location |
| Application information | AF/UE | Information About Applications |
| > Application ID X | AF | Service identifier information, which is used to uniquely identify an application X |
| > Reference weight factor | AF | Reference weight factor of the application X |
| > Duration time | AF | Duration time of the application X |
| UE movement manner (UE movement method) | UE | For example, walking, running, riding a bicycle, riding an e-bike, driving, taking a bus, taking a subway, or taking a train |
| UE scenario | UE | Notification of the place at which the UE has arrived and the route that the UE enters or terminates |
| UE's movement related preset event | UE | For example, stopping a vehicle, starting the vehicle, driving the vehicle through an uphill road section, driving the vehicle through a downhill road section, turning of the vehicle, driving the vehicle through a bridge, or driving the vehicle through a tunnel |
| UE's network related preset event | UE/AMF | For example, a network disconnection or a network standard change |

It should be noted that, first, the user identifier information in Table 3 may be an international mobile subscriber identity (IMSI), a generic public subscription identifier (GPSI), a subscription permanent identifier (SUPI), a globally unique temporary identifier (GUTI), a temporary mobile subscriber identity (TMSI), or the like.

Second, the UE ID in Table 3 may alternatively be identifier information of any terminal device in a network. Therefore, the first network element may collect a large amount of historical data of the terminal device in the network, to obtain an identification model for generating a movement analysis result.

Alternatively, the UE ID may be to-be-analyzed identifier information of the terminal device, to identify a specific terminal device. To be specific, the first network element collects information in the foregoing table only for a specific user, to analyze a movement manner of the specific user.

Therefore, a specific implementation in which the first network element collects the historical data in Step 1 may be applied to Step 500 in the following embodiment shown in FIG. 5. To be specific, the first network element may collect data of a plurality of terminal devices in the implementation provided in Step 1, or the first network element may collect data of a terminal device (for example, data of the first terminal device) in the implementation provided in Step 1.

Third, the application information in Table 3 may include an application ID, a reference weight factor, and a duration. For example, the application information includes an ID of the application A, a reference weight factor of the application A, a duration of the application A, an ID of the application B, a reference weight factor of the application B, and a duration of the application B. The reference weight factor may be used to indicate a confidence level of analyzing the movement manner of the UE based on the application. For example, it is assumed that the application A is a music application and the application B is a traffic application, the reference weight factor of the application A is less than the reference weight factor of the application B.

Fourth, as shown in Table 3, the UE may directly obtain the movement manner of the UE and the preset event experienced by the UE, and report the movement manner and the preset event to the first network element. Therefore, repeated learning by the first network element can be avoided.

Phase 2: The first network element performs data training based on the collected historical data, to obtain the preset model used to generate the movement analysis result.

It may be understood that the historical data (for example, the data listed in Table 1, Table 2, and Table 3) collected by the first network element is not all essential data. More collected historical data indicates higher accuracy of the movement analysis result and higher reliability of the obtained preset model.

A specific implementation of how the first network element performs training based on the collected historical data to obtain the preset model used to generate the movement analysis result is not limited in this embodiment of this application. For example, the first network element may use a method such as big data-based statistical analysis or machine learning.

In some embodiments, the first network element performs unsupervised learning based on the collected historical data, to obtain the preset model used to generate the movement analysis result.

In some embodiments, if the first network element can directly obtain, from the UE side, the movement manner of the UE and the preset event experienced by the UE, the movement manner of the UE and the preset event experienced by the UE that are reported by the UE may be used as labels, and the first network element performs supervised learning based on these labels, to obtain the preset model used to generate the movement analysis result. The preset model is obtained in this manner, so that accuracy of analyzing the movement manner of the UE and the preset event experienced by the UE can be improved, and reliability of the preset model can be further improved.

In some embodiments, after the first network element obtains the preset model used to generate the movement analysis result, the first network element may generate a corresponding movement analysis result based on the historical data of the UE. If the first network element can directly obtain, from the UE side, both the movement manner of the UE and the preset event experienced by the UE, the first network element may adjust the preset model based on the movement manner of the UE and the preset event experienced by the UE, or may assign different weights to the movement analysis result of the first network element, the movement manner of the UE reported by the UE, and the preset event experienced by the UE reported by the UE, to update the movement analysis result of the first network element. The preset model is obtained in this manner, so that accuracy of analyzing the movement manner of the UE and the preset event experienced by the UE can be improved, and reliability of the preset model can be further improved.

Historical data of one UE is used as an example. The NWDAF obtains the movement analysis result of the UE based on the collected historical data of the UE. The movement analysis result of the UE includes a movement track of the UE, a start time and an end time corresponding to the movement track, a movement manner used by the UE on the movement track, a preset event experienced by the UE on the movement track, an occurrence time corresponding to each preset event, and the like. Details are shown in Table 4 and Table 5. Further, the first network element may obtain, through training based on a large amount of the collected historical data, the preset model used to generate the movement analysis result.

TABLE 4

UE movement analysis result
Information

Start time, End time, and Timestamp
UE movement track and application usage behavior (for example, sports or traffic application, applet, and NFC usage behavior)
UE movement manner (for example, walking, running, riding a bicycle, riding an e-bike, driving, taking a bus, taking a subway, or taking a train)
UE's movement related preset event (for example, stopping a vehicle, starting the vehicle, driving the vehicle through an uphill road section, driving the vehicle through a downhill road section, turning of the vehicle, driving the vehicle through a bridge, or driving the vehicle through a tunnel)
UE's network related preset event (for example, a network disconnection or a network standard change)

TABLE 5

Detailed NWDAF analysis results

| Information | Data description |
| --- | --- |
| UE ID | User identifier information, which is used to uniquely identify a user |
| > Timestamp or period | Moment/Period |
| > UE location information or UE movement track (UE Location/UE mobility trajectory) | User location information statistics result/ movement track information, which can be network location or other geographical location information |
| Application ID | Service identifier information used by the UE, which is used to uniquely identify a service |
| > UE movement manner analytics data (UE movement method analytics) | UE movement manner analytics data |
| >> UE movement manner (UE movement method) | For example, walking, running, riding a bicycle, riding an e-bike, driving, taking a bus, taking a subway, or taking a train |
| >>Occurrence probability | UE movement manner occurrence probability |
| >>Duration time | UE movement manner duration |
| > UE's movement related preset event analytics data | UE's movement related preset event analytics data |
| >> UE's movement related preset event | For example, stopping a vehicle, starting the vehicle, driving the vehicle through an uphill road section, driving the vehicle through a downhill road section, turning of the vehicle, driving the vehicle through a bridge, or driving the vehicle through a tunnel |
| >>Occurrence probability | UE's movement related preset event occurrence probability |
| >>Duration time | UE's movement related preset event duration |

TABLE 5-continued

Detailed NWDAF analysis results

| Information | Data description |
| --- | --- |
| > UE's network related preset event analytics data | UE's network related preset event analytics data |
| >> UE's network related preset event | For example, a network disconnection or a network standard change |
| >>Occurrence probability | UE's network related preset event occurrence probability |
| >>Duration time | UE's network related preset event duration |

Figure 5:
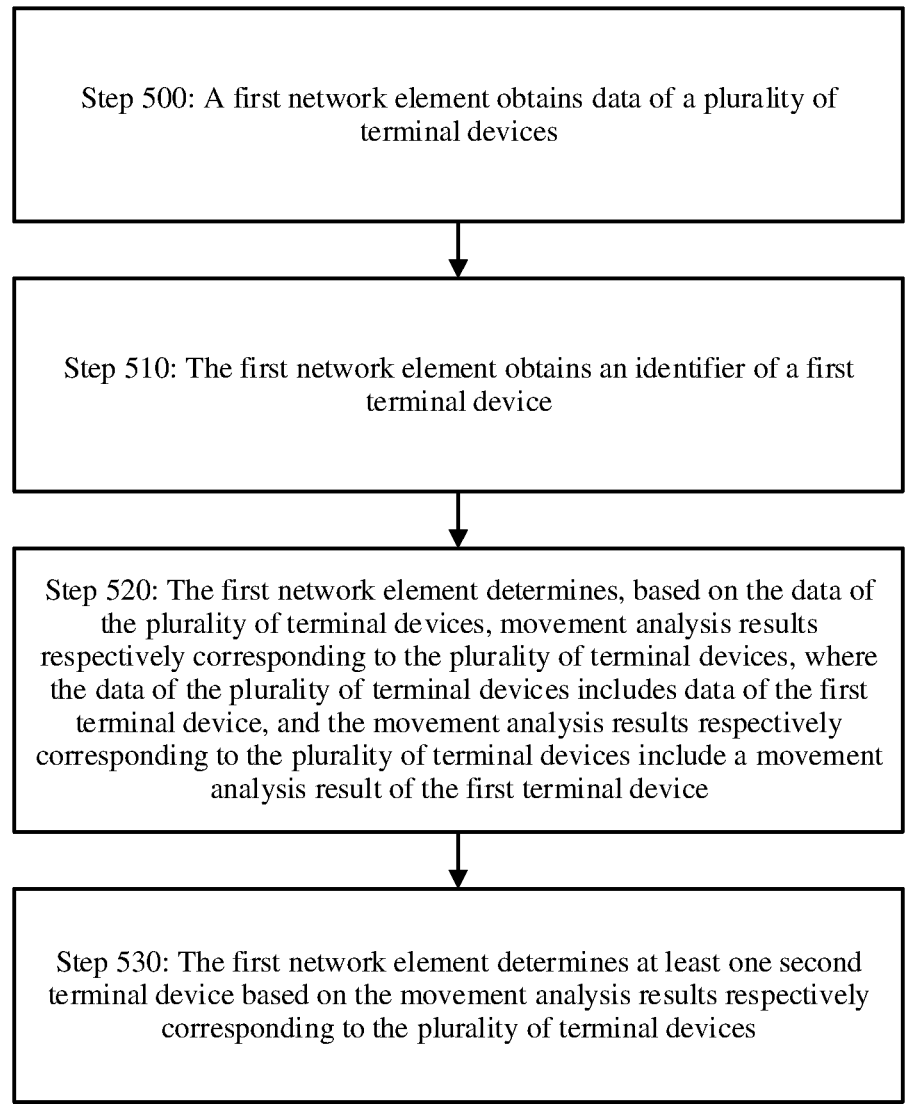
FIG. 5 is an overview flowchart of determining a close contact terminal device according to an embodiment of this application.

As shown in FIG. 5, the following describes in detail a method for determining a close contact terminal device according to an embodiment of this application.

Step 500: A first network element obtains data of a plurality of terminal devices.

For a specific manner of obtaining data of another terminal device in the plurality of terminal devices, refer to the manner of obtaining the historical data of the plurality of terminal devices in Step 1 shown in FIG. 4. Repeated content is not described again. The data of the plurality of terminal devices includes data of a first terminal device. The data of the first terminal device includes at least one of application data of the first terminal device, location information of the first terminal device, an identifier of a serving cell in which the first terminal device is located, an identifier of a neighboring cell of the serving cell, a signal strength measurement value of the serving cell, a signal quality measurement value of the serving cell, a signal-to-noise ratio of the serving cell, or a signal strength measurement value of the neighboring cell. The data of the first terminal device obtained by the first network element may be more than or less than the foregoing listed data. This is not limited in this application.

Step 510: The first network element obtains an identifier of the first terminal device.

The first network element may obtain the identifier of the first terminal device by using another network element. For example, the another network element may be an AF or an NWDAF that has an epidemic management function. In some embodiments, the first network element receives second information from a second network element. The second information is used to request a terminal device in close contact with the first terminal device, and the second information includes the identifier of the first terminal device. The identifier of the first terminal device includes a UE ID, a mobile phone number, an owner name of the first terminal device, identity information of the owner of the first terminal device, and the like. The terminal device in close contact with the first terminal device is a terminal device used by a person in close contact with a user of the first terminal device.

For example, the second information may further include a type identifier (analytic ID), and the type identifier is used to indicate a request for the terminal device in close contact with the first terminal device. The second information may further include a reporting condition, and the reporting condition is used to indicate the first network element to feed back, based on the reporting condition, the terminal device in close contact with the first terminal device. For example, the reporting condition may be regular reporting or periodic reporting, and reporting is performed when a movement analysis result of the first terminal device changes. The second information may further include filtering information, which is used to request a terminal device corresponding to a movement analysis result corresponding to the filtering information, or a terminal device corresponding to a movement analysis result that meets the filtering information. For example, the second information may include a time filtering condition (for example, a time period) or a location filtering condition (for example, a specific geographic area).

In some embodiments, the second information further indicates a first time period, for example, from 5 p.m. to 7 p.m. When performing Step 520, the first network element may determine, based on the data of the plurality of terminal devices, movement analysis results respectively corresponding to the plurality of terminal devices in the first time period.

In some embodiments, the second information further indicates a first area, for example, Haidian District, Beijing. When performing Step 520, the first network element may determine, based on the data of the plurality of terminal devices, movement analysis results respectively corresponding to the plurality of terminal devices in the first area.

In some embodiments, the second information further indicates the first time period and the first area. When performing Step 520, the first network element may determine, based on the data of the plurality of terminal devices, movement analysis results respectively corresponding to the plurality of terminal devices in the first area in the first time period.

Step 520: The first network element determines, based on the data of the plurality of terminal devices, movement analysis results respectively corresponding to the plurality of terminal devices. The data of the plurality of terminal devices includes data of the first terminal device, and the movement analysis results respectively corresponding to the plurality of terminal devices include a movement analysis result of the first terminal device. The movement analysis result of the first terminal device includes a movement track of the first terminal device, a movement manner of the first terminal device on the movement track, and a preset event experienced by the first terminal device on the movement track.

It may be understood that the first network element determines, by using the foregoing preset model and based on the data of the plurality of terminal devices, the movement analysis results respectively corresponding to the plurality of terminal devices.

Step 530: The first network element determines at least one second terminal device based on the movement analysis results respectively corresponding to the plurality of terminal devices. A movement track of the second terminal device overlaps the movement track of the first terminal device, a movement manner of the second terminal device is the same as the movement manner of the first terminal device on an overlapping movement track, and there is a same preset event in a preset event experienced by the second terminal device and the preset event experienced by the first terminal device on the overlapping movement track.

In some embodiments, for a movement analysis result (which is referred to as a movement analysis result X) of any terminal device (which is referred to as a terminal device X) in the movement analysis results of the plurality of terminal devices, the first network element may determine, based on correlation between a time feature, a movement track, a movement manner, and a preset event that are in the movement analysis result X and a time feature, a movement track, a movement manner, and a preset event that are in the movement analysis result (which is referred to as a movement analysis result 1) of the first terminal device, whether the terminal device X is the terminal device in close contact with the first terminal device. Specifically, the first network element may separately calculate correlation coefficients of features of a same type in the movement analysis result 1 and the movement analysis result X, to obtain a correlation coefficient corresponding to each feature, for example, a correlation coefficient between the time feature in the movement analysis result 1 and the time feature in the movement analysis result X. In addition, a weight is configured for each feature in advance, so that the first network element can determine a correlation coefficient between the terminal device X and the first terminal device based on the correlation coefficient and the weight that correspond to each feature. A larger value of the correlation coefficient between the terminal device X and the first terminal device indicates a higher probability that the terminal device X is the terminal device in close contact with the first terminal device. For example, a value of the correlation coefficient may be 0 to 1.

In some embodiments, for a movement analysis result (which is referred to as a movement analysis result X) of any terminal device (which is referred to as a terminal device X) in the movement analysis results of the plurality of terminal devices, the first network element may preliminarily determine, based on correlation between the time feature and the movement track that are in the movement analysis result X and the time feature and the movement track that are in the movement analysis result (which is referred to as a movement analysis result 1) of the first terminal device, whether the terminal device X is the terminal device in close contact with the first terminal device. Specifically, the first network element may separately calculate correlation coefficients of features of a same type in the movement analysis result 1 and the movement analysis result X. In addition, a weight is configured for each feature in advance, so that the first network element can determine a value of a first correlation coefficient between the terminal device X and the first terminal device based on the correlation coefficient and the weight that correspond to each feature. Further, if the first correlation coefficient between the terminal device X and the first terminal device is greater than a preset value, the first network element further determines, based on correlation between the movement manner and the preset event that are in the movement analysis result X and the movement manner and the preset event that are in the movement analysis result 1, whether the terminal device X is the terminal device in close contact with the first terminal device. Specifically, the first network element may separately calculate correlation coefficients of features of a same type in the movement analysis result 1 and the movement analysis result X. In addition, a weight is configured for each feature in advance, so that the first network element can determine a value of a second correlation coefficient between the terminal device X and the first terminal device based on the correlation coefficient and the weight that are of the feature. A larger value of the second correlation coefficient between the terminal device X and the first terminal device indicates a higher probability that the terminal device X is the terminal device in close contact with the first terminal device.

It should be noted that correlation between movement tracks in two movement analysis results should be determined based on network topology information, to avoid incorrectly determining correlation between movement tracks of UEs on a same physical route due to different cell camping data.

Further, in some embodiments, after the first network element determines the at least one second terminal device, the first network element may send first information to the second terminal device. Alternatively, the first network element may send first information to the second terminal device by using another network element. The first information indicates that the second terminal is the terminal device in close contact with the first terminal device. According to the foregoing design, the first network element may directly notify the second terminal device that the second terminal device is the terminal device in close contact with the first terminal device.

In some embodiments, with reference to Step 510, after the first network element determines the at least one second terminal device, when the second network element sends the second information to the first network element, the first network element may further send third information to the second network element. The third information includes an identifier of the at least one second terminal device. The identifier of the second terminal device includes a UE ID, a mobile phone number, an owner name of the second terminal device, identity information of the owner of the second terminal device, and the like. For example, the third information includes an identifier of UE 1, an identifier of UE 3, and an identifier of UE 8. The first network element determines, based on the movement analysis results respectively corresponding to the plurality of terminal devices, that terminal devices that are in close contact with and correspond to the UE 1 are UE 2 and UE 4, terminal devices that are in close contact with and correspond to the UE 3 are UE 5 and UE 9, and a terminal device that is in close contact with and corresponds to the UE 8 is UE 10. The first network element sends the third information to the second network element. The third information may be shown in Table 6.

TABLE 6

| UE 1 ID | UE 2 ID and UE 4 ID |
| UE 3 ID | UE 5 ID and UE 9 ID |
| UE 8 ID | UE 10 ID |

In addition, the third information may further include a time point (for example, which may be determined by using a same preset event experienced by the first terminal device and the second terminal device, or may be a start time of an overlapping movement track) at which the first terminal device contacts with the second terminal device, a contact path (that is, the overlapping movement track), a contact duration (that is, a duration corresponding to the overlapping movement track), and a contact manner (that is, a movement manner).

In some embodiments, the first network element may further determine, based on the movement analysis results respectively corresponding to the plurality of terminal devices, a confidence probability corresponding to the at least one second terminal device. The confidence probability is used to describe a possibility that the second terminal device is in close contact with the first terminal device. In this case, the third information may further include the confidence probability corresponding to the at least one second terminal device. The confidence probability is used to describe the possibility that the second terminal device is in close contact with the first terminal device.

Figure 6:
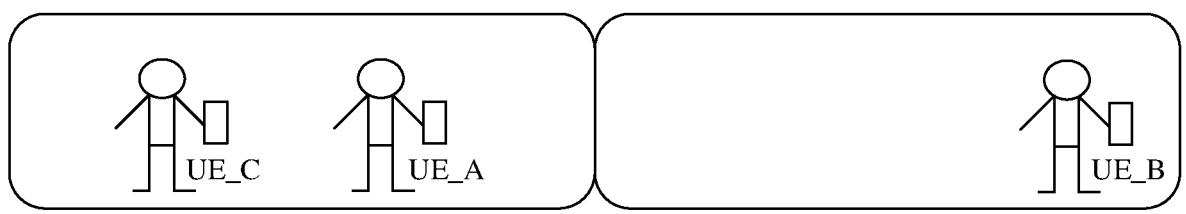
FIG. 6 is a schematic diagram of determining terminal devices located in a same space range of a same vehicle according to an embodiment of this application.

For example, the first network element may further determine a third terminal device from the at least one second terminal device. Both the third terminal device and the first terminal device take a first vehicle on a first movement track, and a difference between a time point when the first terminal device experiences a first event and a time point when the third terminal device experiences the first event on the first movement track is less than a preset threshold. The first movement track is an overlapping part between a movement track of the third terminal device and the movement track of the first terminal device. It can be learned that there is a high possibility that the third terminal device is in close contact with the first terminal device, that is, there is a high confidence probability corresponding to the third terminal device. For example, the first network element may determine, based on a movement analysis result of UE_A, UE_B and UE_C from movement analysis results respectively corresponding to the plurality of terminal devices. A movement track of the UE_A overlaps a movement track of the UE_B, and both the UE_A and the UE_B take a subway on an overlapping movement track. In addition, a difference between a time point when the UE_A experiences an event that the subway passes through a tunnel and a time point when the UE_B experiences the event that the subway passes through the tunnel on the overlapping movement track is greater than a preset threshold. The movement track of the UE_A overlaps a movement track of the UE_C, and both the UE_A and the UE_C take a subway on an overlapping movement track. In addition, a difference between a time point when the UE_A experiences the event that the subway passes through the tunnel and a time point when the UE_C experiences the event that the subway passes through the tunnel on the overlapping movement track is less than the preset threshold (for example, 2 s). Therefore, a possibility that the UE_C is in close contact with the UE_A is higher than a possibility that the UE_B is in close contact with the UE_A, that is, a confidence probability corresponding to the UE_C is higher than a confidence probability corresponding to the UE_B, as shown in FIG. 6.

Further, the first network element may send fourth information to the second network element. The fourth information indicates that the third terminal device and the first terminal device have been located in a same space range of the first vehicle. The space range herein usually may be closed space, or certainly may be open space. For example, as described in the foregoing example, the fourth information indicates that the UE_C and the UE_A may have been located in a same carriage of the subway, as shown in FIG. 6.

In addition, in some embodiments, after the first network element determines the at least one second terminal device, the first network element may receive fifth information from a fourth terminal device. The fifth information is used to query whether the fourth terminal device is the terminal device in close contact with the first terminal device, and the fifth information includes an identifier of the fourth terminal device. When the first network element determines that the fourth terminal device is one of the at least one second terminal device, the first network element sends sixth information to the fourth terminal device. The sixth information indicates that the fourth terminal device is the terminal device in close contact with the first terminal device. Alternatively, when the first network element determines that the fourth terminal device is not one of the at least one second terminal device, the first network element sends seventh information to the fourth terminal device. The seventh information indicates that the fourth terminal device is not the terminal device in close contact with the first terminal device. In the foregoing embodiment, a user can actively query whether the user is a person in close contact with a confirmed case.

Figure 7:
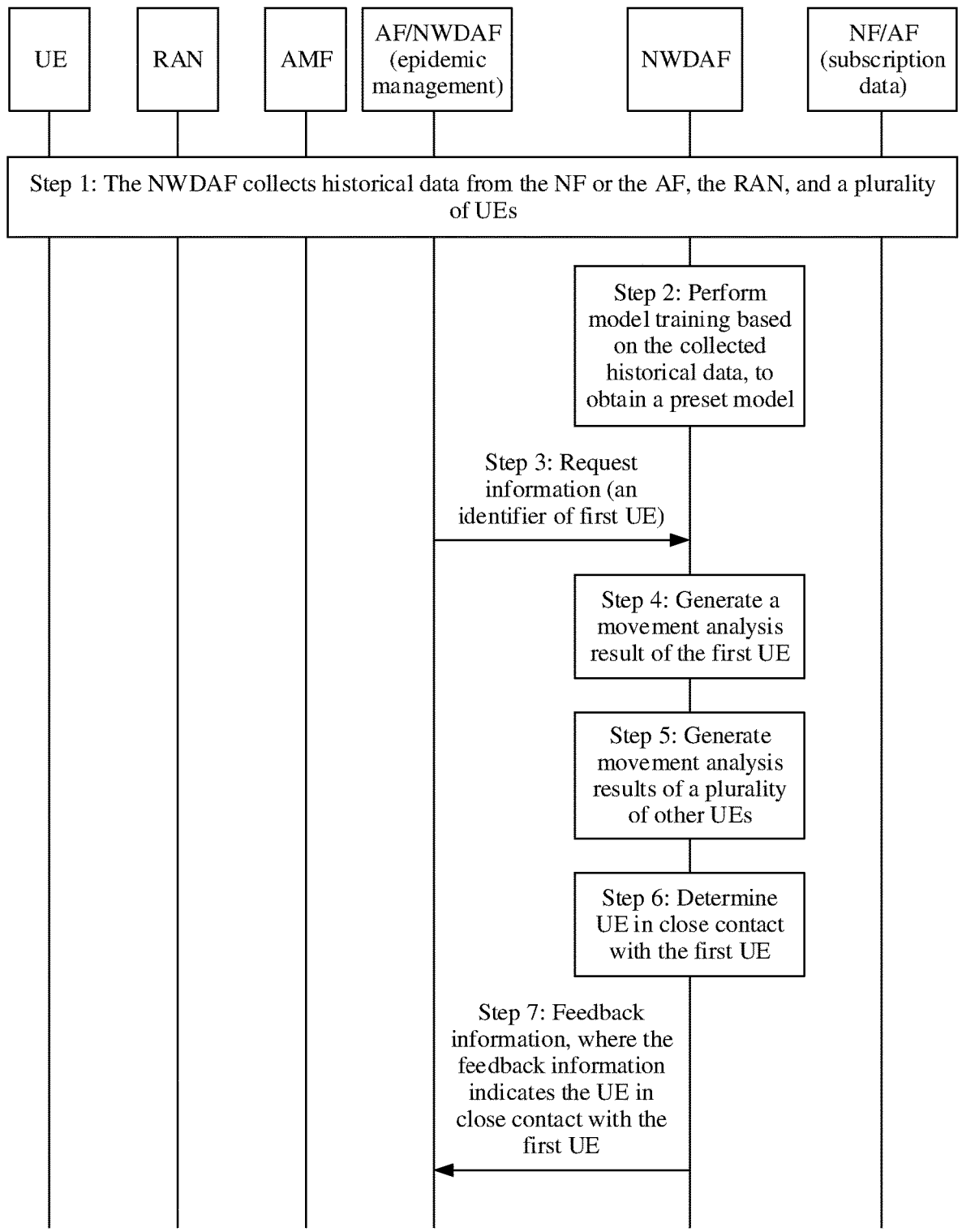
FIG. 7 is a specific flowchart of determining a close contact terminal device according to an embodiment of this application.

The following describes a specific procedure in an embodiment of this application with reference to FIG. 7. The following NWDAF may correspond to the first network element in the foregoing embodiment, and an AF or an NWDAF that has an epidemic management function may correspond to the second network element in the foregoing embodiment.

Step 1: The NWDAF collects historical data from an NF or the AF, a RAN, and a plurality of UEs.

Step 2: The NWDAF performs model training based on the collected historical data, to obtain a preset model, where the preset model is used to generate a movement analysis result.

Step 3: The NWDAF receives request information from the AF or the NWDAF that has the epidemic management function, where the request information includes information about a confirmed case suffering from an infectious disease.

It may be understood that the request information may include information about a plurality of confirmed cases suffering from an infectious disease. The following uses information about only one confirmed case as an example for description. For example, the request information includes an identifier of first UE used by the confirmed case suffering from an infectious disease.

Step 4: The NWDAF generates a movement analysis result of the first UE based on the identifier of the first UE and collected data of the first UE and by using the preset model.

Step 5: The NWDAF generates movement analysis results of a plurality of other UEs based on collected data of the plurality of other UEs and by using the preset model.

Step 6: The NWDAF determines UE in close contact with the first UE based on the movement analysis result of the first UE and the collected movement analysis results of the plurality of other UEs. The UE in close contact with the first UE and the UE have an overlapping movement track, the UE and the UE use a same movement manner on the movement track, and the UE and the UE experience a same preset event on the movement track. It may be understood that there may be one or more UEs in close contact with the first UE.

Step 7: The NWDAF sends feedback information to the AF or the NWDAF that has the epidemic management function, where the feedback information indicates the UE in close contact with the first UE.

In the foregoing embodiment, a close contact can be accurately located. In addition, this embodiment of this application is not only applicable to screening of a close contact that travels by a transportation means with a real-name information requirement, but also applicable to screening of a close contact that travels in a short distance in a city, for example, travels by a subway or a bus. Therefore, this embodiment of this application is applied to a wide range of scenarios.

It may be understood that, to implement the functions in the foregoing embodiments, the network device and the terminal device include corresponding hardware structures and/or software modules for performing the functions. A person skilled in the art should easily be aware that, in combination with the units and the method steps in the examples described in embodiments disclosed in this application, this application can be implemented by hardware or a combination of hardware and computer software. Whether a function is performed by hardware or hardware driven by computer software depends on particular application scenes and design constraints of the technical solutions.

Figure 8:
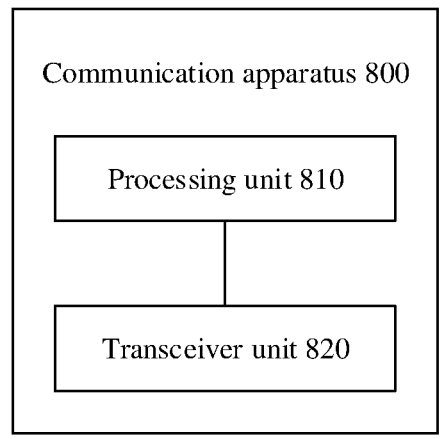
FIG. 8 is a first schematic diagram of a structure of a communication apparatus according to an embodiment of this application.
Figure 9:
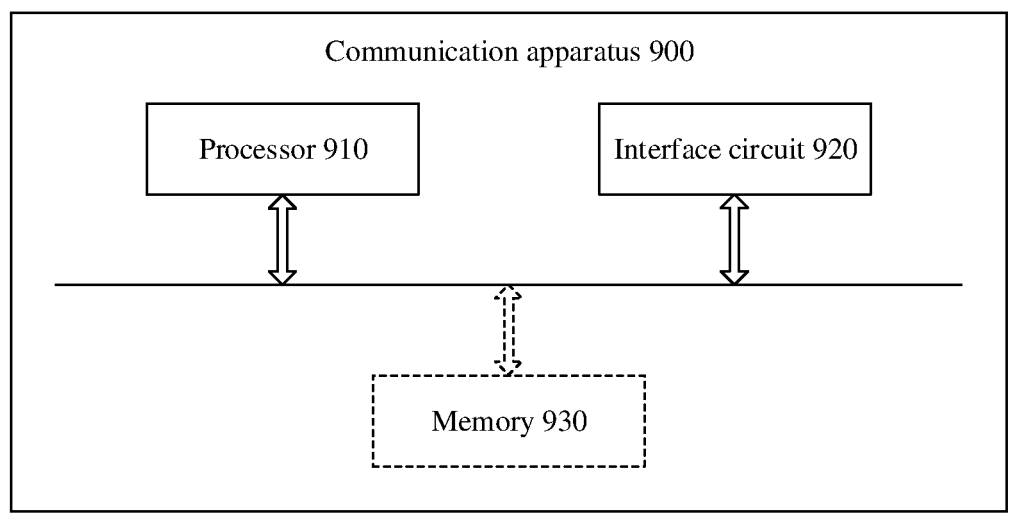
FIG. 9 is a second schematic diagram of a structure of a communication apparatus according to an embodiment of this application.

FIG. 8 and FIG. 9 are schematic diagrams of structures of possible communication apparatuses according to embodiments of this application. The communication apparatus may be configured to implement functions of the terminal device or the network device in the foregoing method embodiment. Therefore, advantageous effects of the foregoing method embodiment can also be implemented. In this embodiment of this application, the communication apparatus may be a first network element or a module (such as a chip) of the first network element.

As shown in FIG. 8, a communication apparatus 800 includes a processing unit 810 and a transceiver unit 820. The communication apparatus 800 is configured to implement a function of the first network element in the method embodiment shown in FIG. 5.

When the communication apparatus 800 is configured to implement the function of the first network element in the method embodiment shown in FIG. 5, the transceiver unit 820 is configured to obtain data of a plurality of terminal devices.

The transceiver unit 820 is further configured to obtain an identifier of the first terminal device.

The processing unit 810 is configured to determine, based on the data of the plurality of terminal devices, movement analysis results respectively corresponding to the plurality of terminal devices. The data of the plurality of terminal devices includes data of the first terminal device, and the movement analysis results respectively corresponding to the plurality of terminal devices include a movement analysis result of the first terminal device. The movement analysis result of the first terminal device includes a movement track of the first terminal device, a movement manner of the first terminal device on the movement track, and a preset event experienced by the first terminal device on the movement track.

The processing unit 810 is further configured to determine at least one second terminal device based on the movement analysis results respectively corresponding to the plurality of terminal devices. A movement track of the second terminal device overlaps the movement track of the first terminal device, a movement manner of the second terminal device is the same as the movement manner of the first terminal device on an overlapping movement track, and there is a same preset event in a preset event experienced by the second terminal device and the preset event experienced by the first terminal device on the overlapping movement track.

For more detailed descriptions of the processing unit 810 and the transceiver unit 820, directly refer to related descriptions in the method embodiment shown in FIG. 5. Details are not described herein again.

As shown in FIG. 9, a communication apparatus 900 includes a processor 910 and an interface circuit 920. The processor 910 and the interface circuit 920 are coupled to each other. It can be understood that the interface circuit 920 may be a transceiver or an input/output interface. Optionally, the communication apparatus 900 may further include a memory 930, configured to store instructions executed by the processor 910, or store input data for the processor 910 to run instructions, or store data generated after the processor 910 runs instructions.

When the communication apparatus 900 is configured to implement the method shown in FIG. 5, the processor 910 is configured to implement a function of the processing unit 810, and the interface circuit 920 is configured to implement a function of the transceiver unit 820.

When the communication apparatus is a chip used in a first network element, the chip of the first network element implements a function of the first network element in the foregoing method embodiment. The chip of the first network element receives information from another module (for example, a radio frequency module or an antenna) in the first network element. For example, the information is sent by a second network element or a fourth terminal device to the first network element. Alternatively, the chip of the first network element sends information to another module (for example, a radio frequency module or an antenna) in the first network element. The information is sent by the first network element to a second network element or a fourth terminal device.

It may be understood that the processor in this embodiment of this application may be a central processing unit (CPU), may be another general-purpose processor, a digital signal processor (DSP), an application-specific integrated circuit (ASIC), a field programmable gate array (FPGA), another programmable logic device, a transistor logic device, a hardware component, or any combination thereof. The general-purpose processor may be a microprocessor or any conventional processor.

The method steps in embodiments of this application may be implemented in a hardware manner, or may be implemented in a manner of executing software instructions by the processor. The software instructions may include a corresponding software module. The software module may be stored in a random access memory (RAM), a flash memory, a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), a register, a hard disk, a removable hard disk, a CD-ROM, or any other form of storage medium well-known in the art. For example, a storage medium is coupled to a processor, so that the processor can read information from the storage medium and write information into the storage medium. Certainly, the storage medium may be a component of the processor. The processor and the storage medium may be disposed in an ASIC. In addition, the ASIC may be located in a network device or a terminal device. Certainly, the processor and the storage medium may alternatively exist in the network device or the terminal device as discrete components.

All or some of the foregoing embodiments may be implemented by using software, hardware, firmware, or any combination thereof. When software is used to implement embodiments, all or some of embodiments may be implemented in a form of a computer program product. The computer program product includes one or more computer programs or instructions. When the computer programs or the instructions are loaded and executed on a computer, the procedures or the functions according to embodiments of this application are all or partially implemented. The computer may be a general-purpose computer, a dedicated computer, a computer network, a network device, user equipment, or another programmable apparatus. The computer programs or instructions may be stored in a computer-readable storage medium, or may be transmitted from one computer-readable storage medium to another computer-readable storage medium. For example, the computer programs or instructions may be transmitted from one website, computer, server, or data center to another website, computer, server, or data center in a wired manner or in a wireless manner. The computer-readable storage medium may be any usable medium accessible by a computer, or a data storage device, such as a server or a data center, integrating one or more usable media. The usable medium may be a magnetic medium, for example, a floppy disk, a hard disk, or a magnetic tape, may be an optical medium, for example, a digital video disc (DVD), may be a semiconductor medium, for example, a solid-state drive (SSD), or the like.

In embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

In this application, at least one means one or more, and a plurality of means two or more. The term "and/or" describes an association relationship for describing associated objects and represents that any one of three relationships may exist. For example, A and/or B may represent any one of the following three cases: Only A exists, both A and B exist, or only B exists. A and B each may be singular or plural. In the text descriptions of this application, the character "I" generally indicates an "or" relationship between the associated objects. In a formula in this application, the character "I" indicates a "division" relationship between the associated objects.

It may be understood that numerical symbols involved in embodiments of this application are differentiated merely for ease of description, but are not used to limit the scope of embodiments of this application. The sequence numbers of the foregoing processes do not mean execution sequences, and the execution sequences of the processes should be determined based on functions and internal logic of the processes.

What is claimed is:

1. A method for determining a terminal device in close contact with another terminal device, comprising:
    obtaining, by a first network element, data of a plurality of terminal devices;
    obtaining, by the first network element, an identifier of a first terminal device;
    determining, by the first network element based on the data of the plurality of terminal devices, movement analysis results respectively corresponding to the plurality of terminal devices, wherein the data of the plurality of terminal devices comprises historical movement data of the first terminal device, the movement analysis results comprise a movement analysis result of the first terminal device, and the movement analysis result of the first terminal device comprises a movement track of the first terminal device, a start time and an end time corresponding to the movement track, a movement manner of the first terminal device on the movement track, and an event experienced by the first terminal device on the movement track; and
    determining, by the first network element, at least one second terminal device based on the movement analysis results, wherein a movement track of the second terminal device overlaps the movement track of the first terminal device, a movement manner of the second terminal device is the same as the movement manner of the first terminal device on an overlapping movement track, and an event experienced by the second terminal device is the same as the event experienced by the first terminal device on the overlapping movement track.

2. The method according to claim 1, further comprising:
    sending, by the first network element, first information to the second terminal device, wherein the first information indicates that the second terminal device is a terminal device in close contact with the first terminal device.

3. The method according to claim 2, wherein the first information further indicates a first time period; and
    the determining, by the first network element based on the data of the plurality of terminal devices, movement analysis results respectively corresponding to the plurality of terminal devices comprises:
    determining, by the first network element based on the data of the plurality of terminal devices, movement analysis results respectively corresponding to the plurality of terminal devices in the first time period.

4. The method according to claim 2, wherein the first information further indicates a first area; and
    the determining, by the first network element based on the data of the plurality of terminal devices, movement analysis results respectively corresponding to the plurality of terminal devices comprises:
    determining, by the first network element based on the data of the plurality of terminal devices, movement analysis results respectively corresponding to the plurality of terminal devices in the first area.

5. The method according to claim 2, wherein the first information further indicates a first time period; and
    the determining of the movement analysis results respectively corresponding to the plurality of terminal devices comprises:
    determining based on the data of the plurality of terminal devices, movement analysis results respectively corresponding to the plurality of terminal devices in the first time period.

6. The method according to claim 1, wherein the obtaining, by the first network element, an identifier of a first terminal device comprises:
    receiving, by the first network element, second information from a second network element, wherein the second information requests the terminal device in close contact with the first terminal device, and the second information comprises the identifier of the first terminal device, and
    the method further comprises:
    sending, by the first network element, third information to the second network element, wherein the third information indicates that the at least one second terminal device is the terminal device in close contact with the first terminal device.

7. The method according to claim 6, wherein the third information further comprises a confidence probability corresponding to the at least one second terminal device, and the confidence probability represents a possibility that the second terminal device is in close contact with the first terminal device.

8. The method according to claim 6, further comprising:
    determining, by the first network element, a third terminal device, wherein the third terminal device is one of the at least one second terminal device, both the third terminal device and the first terminal device take a first vehicle on a first movement track, a difference between a time point when the first terminal device experiences a first event and a time point when the third terminal device experiences the first event on the first movement track is less than a threshold, and the first movement track is determined by an overlapping part between a movement track of the third terminal device and the movement track of the first terminal device; and sending, by the first network element, fourth information to the second network element, wherein the fourth information indicates that the third terminal device and the first terminal device have been located in a same space range of the first vehicle.

9. The method according to claim 8, wherein the event experienced by the first terminal device comprises at least one of stopping the first vehicle, starting the first vehicle, driving the first vehicle through an uphill road section, driving the first vehicle through a downhill road section, turning of the first vehicle, driving the first vehicle through a bridge, driving the first vehicle through a tunnel, a network disconnection, or a network standard change.

10. The method according to claim 1, further comprising:
receiving, by the first network element, fifth information from a fourth terminal device, wherein the fifth information is used to query whether the fourth terminal device is the terminal device in close contact with the first terminal device, and the fifth information comprises an identifier of the fourth terminal device; and
when the first network element determines that the fourth terminal device is one of the at least one second terminal device, sending, by the first network element, sixth information to the fourth terminal device, wherein the sixth information indicates that the fourth terminal device is the terminal device in close contact with the first terminal device.

11. The method according to claim 1, wherein the data of the first terminal device comprises at least one of application data of the first terminal device, location information of the first terminal device, an identifier of a serving cell in which the first terminal device is located, an identifier of a neighboring cell of the serving cell, a signal strength measurement value of the serving cell, a signal quality measurement value of the serving cell, a signal-to-noise ratio of the serving cell, or a signal strength measurement value of the neighboring cell.

12. The method according to claim 11, wherein the determining, by the first network element based on the data of the plurality of terminal devices, movement analysis results respectively corresponding to the plurality of terminal devices comprises:
determining, by the first network element by using a preset model and based on the data of the plurality of terminal devices, the movement analysis results respectively corresponding to the plurality of terminal devices, wherein the preset model is used to generate the movement analysis result.

13. The method according to claim 12, wherein the preset model is obtained based on a plurality of pieces of historical data, a $j^{th}$ piece of historical data corresponds to a $j^{th}$ terminal device, j is a positive integer, and the $j^{th}$ piece of historical data comprises at least one of application data of the $j^{th}$ terminal device, location information of the $j^{th}$ terminal device, an identifier of a serving cell in which the $j^{th}$ terminal device is located, an identifier of a neighboring cell of the serving cell in which the $j^{th}$ terminal device is located, a signal strength measurement value of the serving cell in which the $j^{th}$ terminal device is located, a signal quality measurement value of the serving cell in which the $j^{th}$ terminal device is located, a signal-to-noise ratio of the serving cell in which the $j^{th}$ terminal device is located, or a signal strength measurement value of the neighboring cell of the serving cell in which the $j^{th}$ terminal device is located.

14. A communication apparatus, comprising a processor and an interface circuit, wherein the interface circuit is configured to receive a signal from a communication apparatus other than the communication apparatus and transmit the signal to the processor, or send a signal from the processor to a communication apparatus other than the communication apparatus, and the processor invoke a logic circuit or executing code instructions enable the communication apparatus to perform operations comprising:
obtaining data of a plurality of terminal devices;
obtaining an identifier of a first terminal device;
determining based on the data of the plurality of terminal devices, movement analysis results respectively corresponding to the plurality of terminal devices, wherein the data of the plurality of terminal devices comprises historical movement data of the first terminal device, the movement analysis results comprise a movement analysis result of the first terminal device, and the movement analysis result of the first terminal device comprises a movement track of the first terminal device, a start time and an end time corresponding to the movement track, a movement manner of the first terminal device on the movement track, and an event experienced by the first terminal device on the movement track; and
determining at least one second terminal device based on the movement analysis results, wherein a movement track of the second terminal device overlaps the movement track of the first terminal device, a movement manner of the second terminal device is the same as the movement manner of the first terminal device on an overlapping movement track, and an event experienced by the second terminal device is the same as the event experienced by the first terminal device on the overlapping movement track.

15. The communications apparatus according to claim 14, wherein the operations further comprise:
sending first information to the second terminal device, wherein the first information indicates that the second terminal device is a terminal device in close contact with the first terminal device.

16. The communications apparatus according to claim 15, wherein the first information further indicates a first area; and
the determining of the movement analysis results respectively corresponding to the plurality of terminal devices comprises:
determining based on the data of the plurality of terminal devices, movement analysis results respectively corresponding to the plurality of terminal devices in the first area.

17. The communications apparatus according to claim 14, wherein the obtaining an identifier of a first terminal device comprises:
receiving second information from a second communications apparatus, wherein the second information requests a terminal device in close contact with the first terminal device, and the second information comprises the identifier of the first terminal device; and
the operations further comprise:
sending third information to the second communications apparatus, wherein the third information indicates that the at least one second terminal device is the terminal device in close contact with the first terminal device.

18. The communications apparatus according to claim 17, wherein the third information further comprises a confidence probability corresponding to the at least one second terminal device, and the confidence probability represents a possibility that the second terminal device is in close contact with the first terminal device.

19. The communications apparatus according to claim 17, wherein the operations further comprise:

determining a third terminal device, wherein the third terminal device is one of the at least one second terminal device, both the third terminal device and the first terminal device take a first vehicle on a first movement track, a difference between a time point when the first terminal device experiences a first event and a time point when the third terminal device experiences the first event on the first movement track is less than a threshold, and the first movement track is determined by an overlapping part between a movement track of the third terminal device and the movement track of the first terminal device; and sending fourth information to the second communications apparatus, wherein the fourth information indicates that the third terminal device and the first terminal device have been located in a same space range of the first vehicle.

20. The communications apparatus according to claim 14, wherein the operations further comprise:

receiving fifth information from a fourth terminal device, wherein the fifth information is used to query whether the fourth terminal device is the terminal device in close contact with the first terminal device, and the fifth information comprises an identifier of the fourth terminal device; and when the communications apparatus determines that the fourth terminal device is one of the at least one second terminal device, sending sixth information to the fourth terminal device, wherein the sixth information indicates that the fourth terminal device is the terminal device in close contact with the first terminal device.

* * * * *

UNITED STATES PATENT AND TRADEMARK OFFICE
CERTIFICATE OF CORRECTION

PATENT NO. : 12,490,055 B2  
APPLICATION NO. : 18/005255  
DATED : December 2, 2025  
INVENTOR(S) : Fenghui Dou et al.

Page 1 of 1

It is certified that error appears in the above-identified patent and that said Letters Patent is hereby corrected as shown below:

In the Claims

Column 21, Line 30, change "(for example 2 s" to --(for example 2s)--;

Column 25, Line 20, change "character "I"" to --character "/"--; and

Column 25, Line 22, change "character "I"" to --character "/"--.

Signed and Sealed this  
Tenth Day of February, 2026

John A. Squires  
*Director of the United States Patent and Trademark Office*